US012447599B2

(12) United States Patent
Mandal et al.

(10) Patent No.: US 12,447,599 B2
(45) Date of Patent: Oct. 21, 2025

(54) IMPACT TOOL WITH VIBRATION ISOLATION

(71) Applicant: Ingersoll-Rand Industrial U.S., Inc., Davidson, NC (US)

(72) Inventors: Madan Mandal, Bangalore (IN); Mark T. McClung, Andover, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 59 days.

(21) Appl. No.: 18/132,836

(22) Filed: Apr. 10, 2023

(65) Prior Publication Data

US 2023/0241753 A1 Aug. 3, 2023

Related U.S. Application Data

(63) Continuation of application No. 16/547,736, filed on Aug. 22, 2019, now Pat. No. 11,623,336.

(51) Int. Cl.

*B25D 17/24* (2006.01)
*B25B 21/02* (2006.01)
*B25D 17/06* (2006.01)
*B25F 5/00* (2006.01)

(52) U.S. Cl.

CPC .............. *B25F 5/006* (2013.01); *B25B 21/02* (2013.01); *B25D 2250/371* (2013.01)

(58) Field of Classification Search

CPC ................................ B25D 17/24; B25D 17/06
USPC .................... 173/93.5, 171, 210, 211, 90, 93
See application file for complete search history.

(56) References Cited

U.S. PATENT DOCUMENTS 2,341,497 A * 2/1944 Amtsberg ............ B25B 21/026 173/210
4,102,410 A * 7/1978 Ross ...................... B25D 17/08 173/133
4,133,394 A * 1/1979 Wohlwend ............ B25D 17/08 173/210
5,839,517 A 11/1998 Gwinn et al.
5,992,538 A * 11/1999 Marcengill .......... B25D 11/102 173/171
6,318,479 B1 11/2001 Giardino et al.
8,591,136 B2 11/2013 Gasparini et al.
2001/0000882 A1 5/2001 Giardino et al.

(Continued)

FOREIGN PATENT DOCUMENTS

CN 108687707 A 10/2018
CN 209244610 U 8/2019

(Continued)

OTHER PUBLICATIONS

Extended EuropeanSearch Report for European Application No. 20191185.6, dated May 6, 2021.

(Continued)

*Primary Examiner* — Praachi M Pathak
(74) *Attorney, Agent, or Firm* — Kevin E. West; Advent, LLP

(57) ABSTRACT

An impact tool is provided with vibration isolators to reduce vibrations felt by the operator gripping the handle of the tool. The impact tool has a hammer and an anvil that impact against each other during use. The impacts create undesirable vibrations in the tool housing and noise in the work area. The isolators are useful in minimizing such vibrations and noise.

13 Claims, 9 Drawing Sheets

(56) References Cited

U.S. PATENT DOCUMENTS

| | | | |
|---|---|---|---|
| 2004/0037624 A1 | 2/2004 | Gordy et al. | |
| 2005/0061521 A1 | 3/2005 | Saito et al. | |
| 2006/0039748 A1 | 2/2006 | Ruhlander | |
| 2006/0254789 A1 | 11/2006 | Murakami et al. | |
| 2007/0215370 A1 | 9/2007 | Chen | |
| 2007/0289760 A1 | 12/2007 | Sterling et al. | |
| 2009/0283282 A1 | 11/2009 | Zimmermann | |
| 2010/0000749 A1 | 1/2010 | Andel | |
| 2010/0000750 A1 | 1/2010 | Andel | |
| 2010/0314147 A1 | 12/2010 | Muller et al. | |
| 2011/0048751 A1* | 3/2011 | Elger | B25B 21/026 173/93.5 |
| 2011/0180289 A1* | 7/2011 | Kumagai | B25F 5/02 173/90 |
| 2012/0187782 A1 | 7/2012 | Esenwein | |
| 2013/0247609 A1 | 9/2013 | Kaneko | |
| 2019/0143487 A1 | 5/2019 | Clifford et al. | |
| 2019/0156866 A1 | 5/2019 | Wilke et al. | |

FOREIGN PATENT DOCUMENTS

| | | |
|---|---|---|
| DE | 3008430 A1 | 9/1981 |
| DE | 102004032789 A1 | 2/2006 |
| EP | 1712332 A2 | 10/2006 |

OTHER PUBLICATIONS

Partial European Search Report for European Application No. 20191185.6, dated Jan. 27, 2021.

Office Action for Chinese Application No. 202010848467.7, dated Sep. 27, 2023.

Second Office Action for Chinese Application No. 202010848467.7, dated Apr. 29, 2024.

* cited by examiner

IMPACT TOOL WITH VIBRATION ISOLATION

BACKGROUND

The present inventions relate generally to impact tools and an arrangement to reduce vibration experienced by the operator.

Impact tools are known power tools that are commonly used to tighten fasteners but may have other uses as well. While there are many types of mechanisms that may be used in an impact tool, the tool typically has a hammer that periodically engages and disengages with an anvil. This results in impact forces being transmitted from the hammer to the anvil, which is useful for a variety of purposes.

One problem with impact tools is the vibration and noise that is caused by the repeated impacts between the hammer and the anvil. Impact tools typically have a housing that encloses components of the tool and a handle that is dripped by the operator during use of the tool. Thus, vibrations caused by the impact mechanism may travel from the hammer and anvil through the tool housing to the handle where the vibrations are absorbed by the user's hand. This can be a concern especially in industrial factories where operators may use a tool over long periods of time. Noise created by impact tools is also a concern and may require additional hearing protection.

Thus, it would be desirable to lessen the noise created by impact tools and lesson vibrations transmitted to an operator's hand.

SUMMARY

An impact tool is described with a hammer and anvil that each have a drive member. The drive members of the hammer and anvil periodically engage and disengage from each other to create impacts that the anvil transfers to a tool like a socket. Isolators are also described for reducing vibration that is transmitted through the tool housing to the handle which are absorbed by the operator. The isolators may also reduce noise created by the impact tool.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
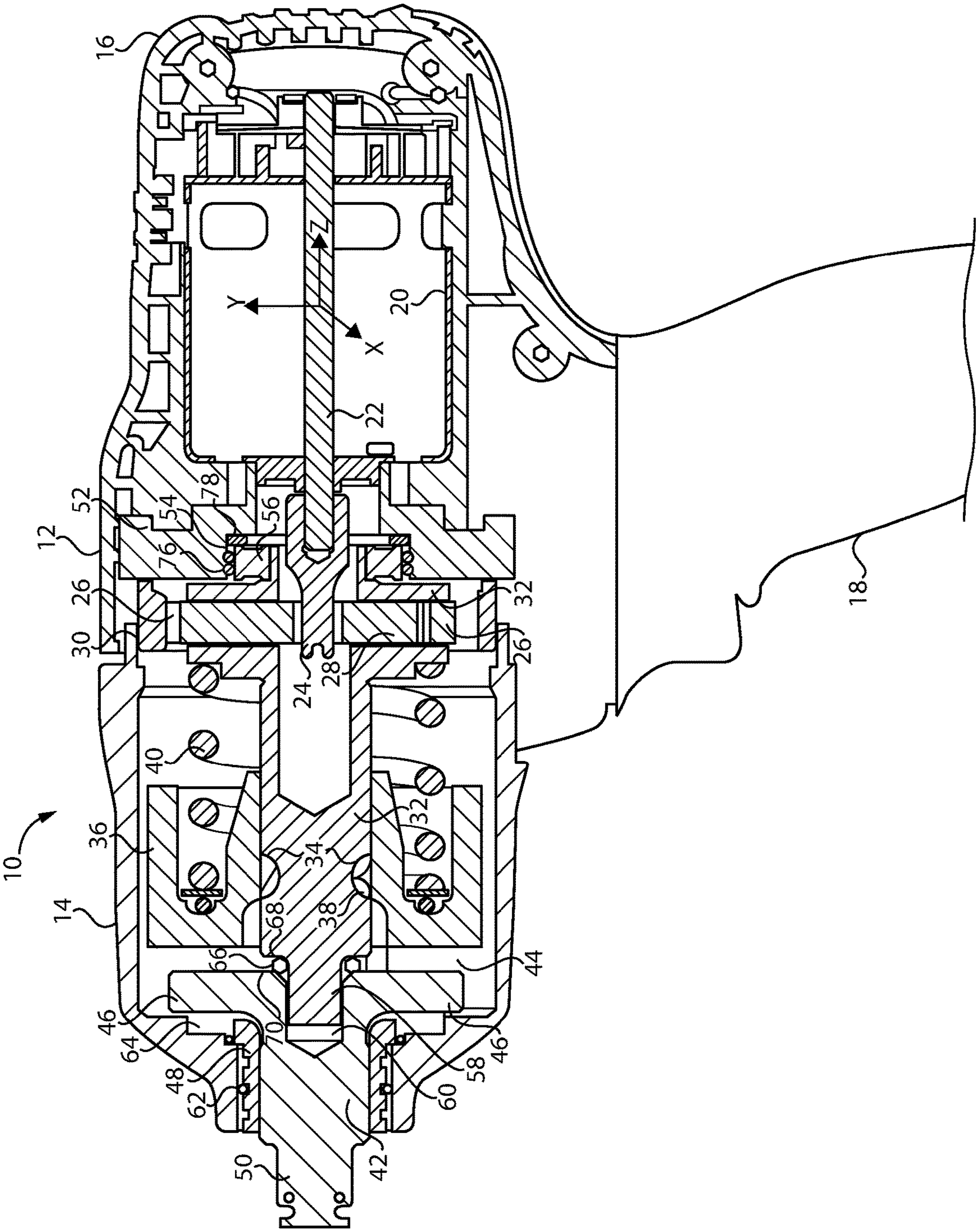
FIG. 1 is a cross-sectional view of one embodiment of an impact tool.

Referring now to the figures, and particularly FIG. 1, the cross-section of an impact tool 10 is shown. Impact tools are known in the art and the particular arrangement of components may vary significantly from tool to tool. Thus, only a general description of the components of the impact tool 10 are necessary for an understanding of the inventions herein. The impact tool 10 typically has a tool housing 12 that encloses the various components of the tool 10. The tool housing 12 may be formed of a first tool housing portion 14 and a second tool housing portion 16 that are attached together. In this arrangement, it may be desirable for the first tool housing portion 14 to be made of metal and the second tool housing portion 16 to be made of plastic. Preferably, the tool housing 12 (and particularly the second tool housing portion 16) may form a handle 18 that an operator may grip during use of the tool 10.

Commonly, the components of the impact tool 10 include a motor 20 that provides the rotational drive for the tool 10. The output shaft 22 of the motor 20 may be connected to a pinion gear 24 which is engaged with the planet gears 26 of a planetary carrier 28. The planet gears 26 are engaged with a ring gear 30 which is rotationally fixed. Thus, the rotational speed of the planetary carrier 28 is reduced relative to the speed of the motor 20 and the torque is increased. A camshaft 32 may be connected to the planetary carrier 28 to rotate together therewith. The camshaft 32 may have one or more helical grooves 34 in the outer surface thereof. The camshaft 32 may be positioned within a central bore of a hammer 36 which also may have helical grooves therein. A ball 38 may be positioned within the grooves of the camshaft 32 and the hammer 36 to connect the camshaft 32 and hammer 36 together while allowing the hammer 36 to move axially and rotationally relative to the camshaft 32. A spring 40 may bias the hammer 36 forward toward an anvil 42.

The hammer 36 may have a drive member 44 that is engageable with a drive member 46 of the anvil 42. In FIG. 1, the drive member 44 of the hammer 36 is one or more frontal protrusions 44 that extend axially toward the anvil 42, and the drive members 46 of the anvil 42 are wings 46 that extend radially with circumferential space therebetween for the protrusions 44 of the hammer 36 to fit within. During operation, the hammer 36 moves axially back-and-fourth and rotationally in response to the drive force of the camshaft 32. As a result, the protrusion 44 of the hammer 36 periodically engages and disengages with the wings 46 of the anvil 42. This causes impact torques to be applied to the anvil 42 such that the hammer 36 rotationally drives the anvil 42 when the drive members 44, 46 are in engagement and the hammer 36 rotates relative to the anvil 42 during disengagement. The anvil 42 extends through a bushing 48 that rotationally supports the anvil 42. An exposed portion 50 of the anvil 42 may be used for engaging a tool, such as a socket, or other component that receives the rotational impact torque of the tool 10.

Preferably, the first tool housing portion 14 encloses the camshaft 32, hammer 36 and the internal portion (e.g., wings 46) of the anvil 42. At the rear of the camshaft 32, a support member 52 may be provided in the second tool housing portion 16 to support the camshaft 32. Preferably, the support member 52 is attached to the tool housing 12 and has a seat 54 for supporting a roller bearing 56. The roller bearing 56 may also be connected to the camshaft 32 to support the camshaft 32. The support member 52 may also be attached to the motor 20 to support the motor 20, and may additionally be attached to the ring gear 30 to support the ring gear 30. At the front of the camshaft 32, a front portion 58 of the camshaft 32 may be inserted into a central bore 60 of the anvil 42 in order to support the front end 58 of the camshaft 32. It is understood that the impact mechanism shown and described is only one type of impact mechanism that may be used and that different types of impact mechanisms may also be used, such as swinging weight mechanisms, Maurer mechanisms, rocking dog mechanisms, ski-jump mechanisms and pin-style mechanisms. The motor may also be various types of motors, such as electric motors, pneumatic motors or any other type of motor that provides drive torque.

Figure 2:
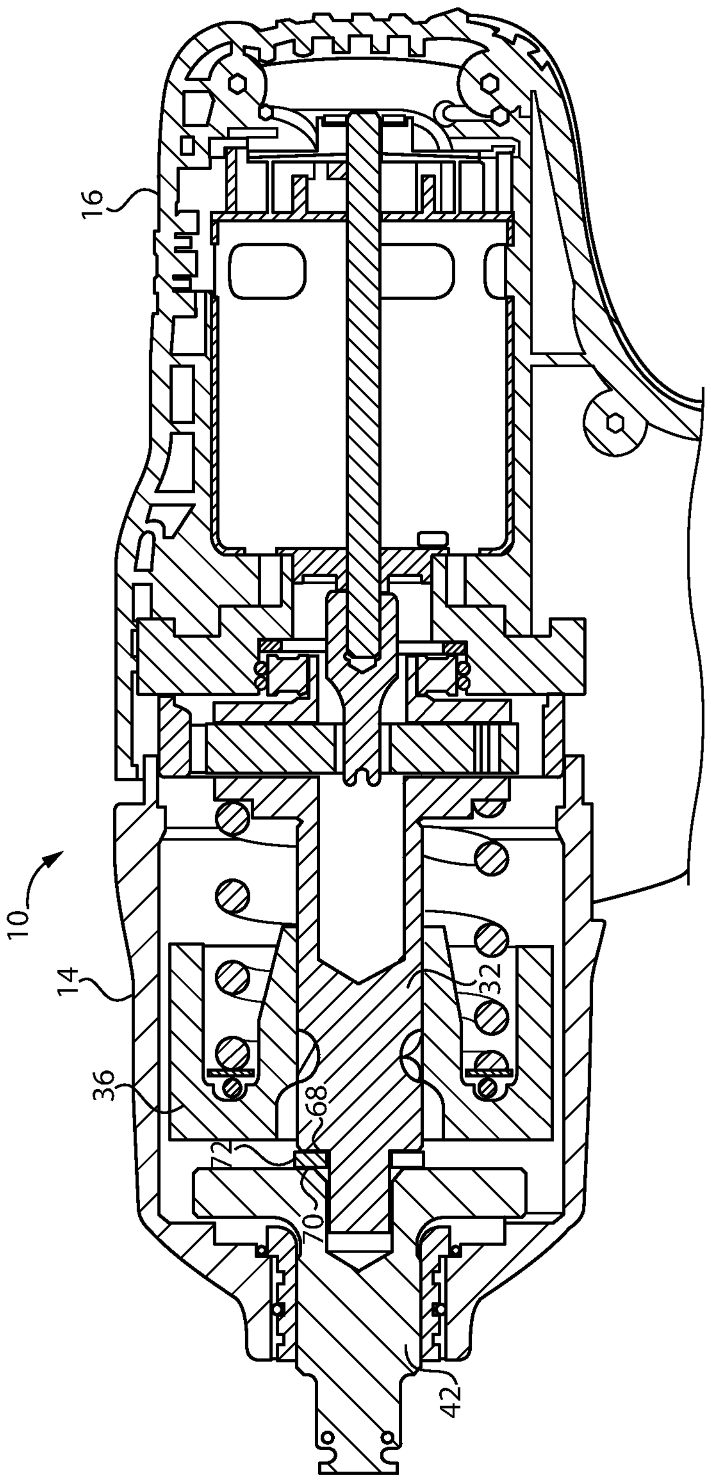
FIG. 2 is a cross-sectional view of another embodiment of an impact tool.
Figure 3:
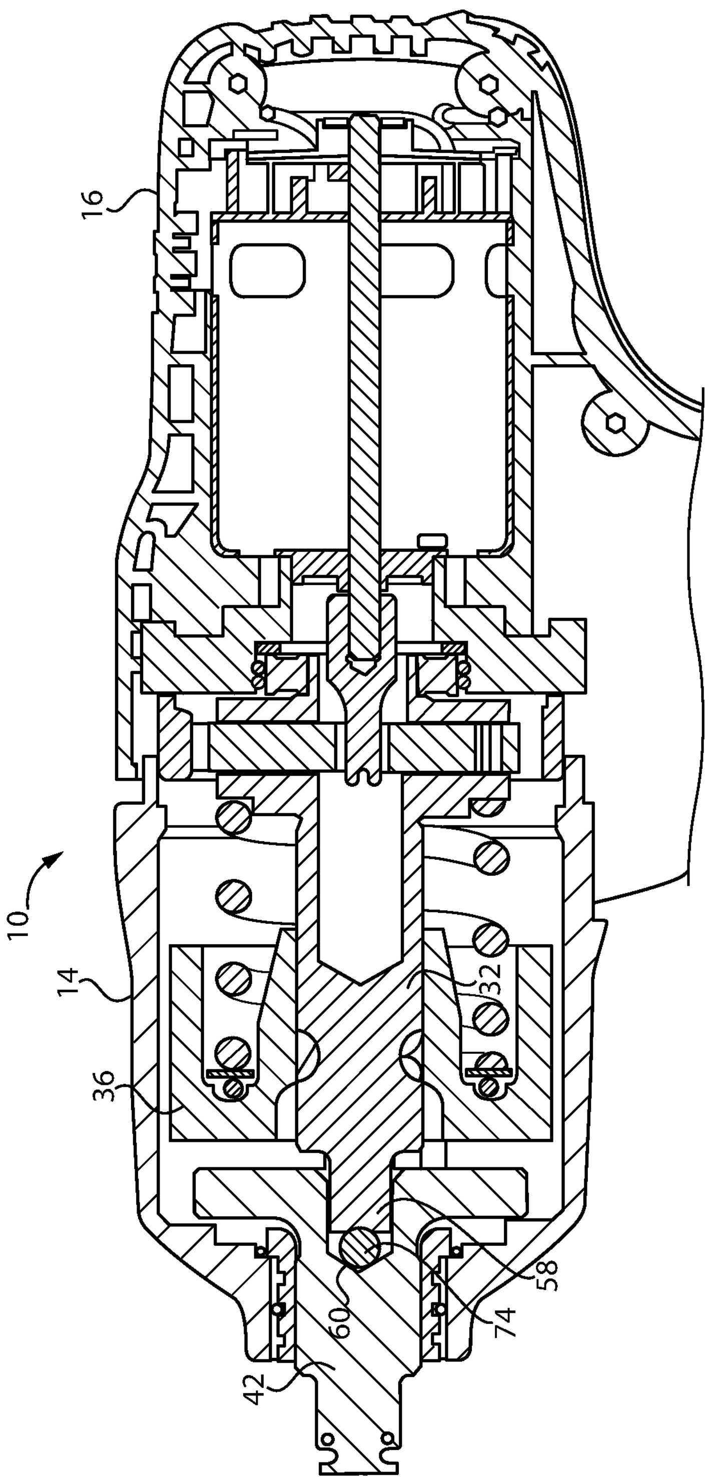
FIG. 3 is a cross-sectional view of another embodiment of an impact tool.

It may be desirable to provide vibration isolators throughout the tool 10 to isolate the vibrations that occur due to the camshaft 32, hammer 36 and anvil 42 from the handle 18 of the tool 10. As shown in FIG. 1, a vibration isolator 62 may be positioned around the circumference of the bushing 48 between the bushing 48 and the first tool housing portion 14. The isolator 62 may be an O-ring 62, and it may be desirable to provide multiple O-rings 62 with one O-ring 62 in each of the outer grooves of the bushing 48. An isolator 64 may also be positioned axially between the anvil 42, and particularly the drive members 46 thereof, and the first tool housing portion 14. The isolator 64 may be a washer 64. An isolator 66 may also be positioned between the camshaft 32 and the anvil 42. For example, the isolator 66 may be an O-ring 66 between the flange 68 of the camshaft 32 and a flange 70 of the anvil 42. Referring to FIG. 2, the isolator 72 may also be a flat washer 72 between the flanges 68, 70. Referring to FIG. 3, the isolator 74 may also be a spherical ball 74 positioned in the central bore 60 of the anvil 42 and against the center end 58 of the camshaft 32.

Referring back to FIG. 1, an isolator 76 may be positioned circumferentially around the roller bearing 56 between the bearing 56 and the support member 52. The isolator may be one or more O-rings 76. An isolator 78 may also be positioned behind the roller bearing 56 axially between the bearing 56 and the support member 52. Preferably, the isolator 78 is only positioned between the outer race of the bearing 56 and the support member 52 to avoid rotational contact with the isolator 78. The isolator 78 may be a washer 78.

Figure 4:
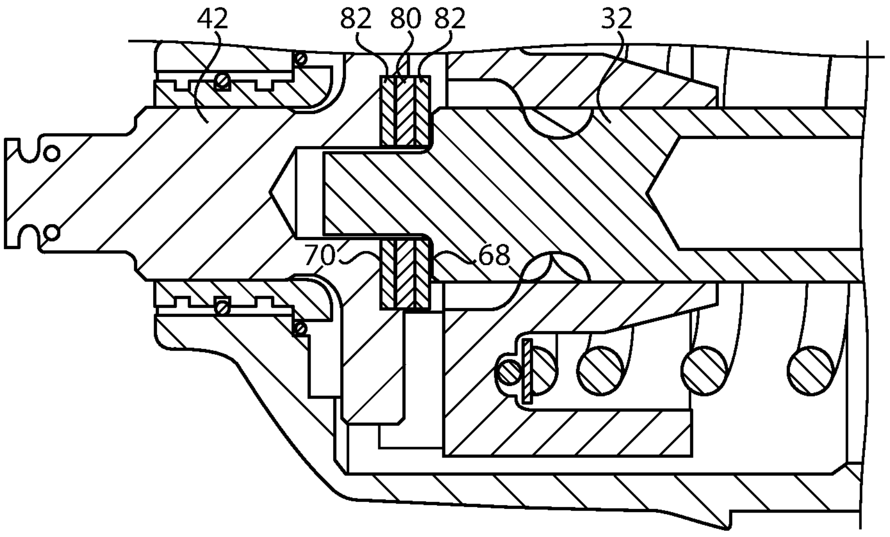
FIG. 4 is a cross-sectional view of a portion of another embodiment of an impact tool.
Figure 5:
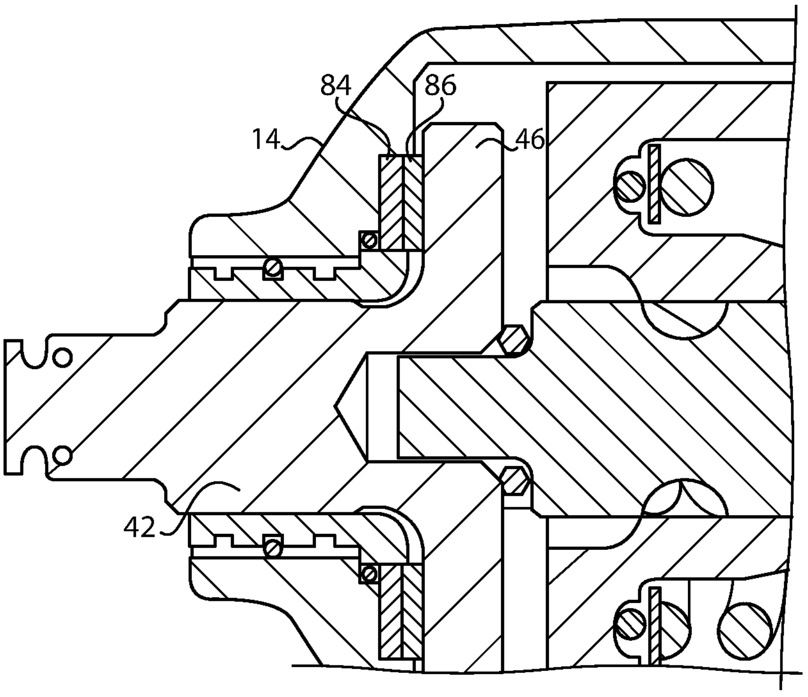
FIG. 5 is a cross-sectional view of a portion of another embodiment of an impact tool.
Figure 6:
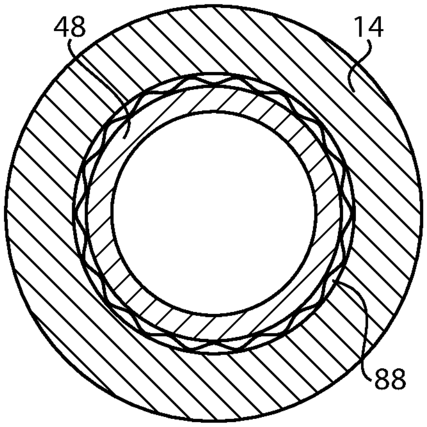
FIG. 6 is a lateral cross-sectional view of a portion of another embodiment of an impact tool.
Figure 7:
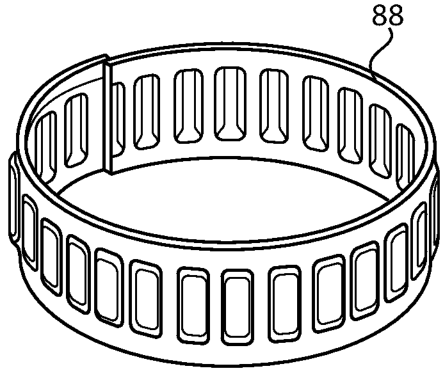
FIG. 7 is a perspective view of a circumferential wave spring.

Turning to FIG. 4, the isolator 80 may be a flat wave spring 80 between the flanges 68, 70 of the camshaft 32 and the anvil 42. Flat washers 82 may also be provided on the outsides of the wave spring 80. As shown in FIG. 5, a flat wave spring 84 may also be provided axially between the anvil 42, and particularly the drive members 46 thereof, and the first tool housing portion 14. A flat washer 86 may also be provided between the wave spring 84 and the drive members 46. As shown in FIG. 6, a circumferential wave spring 88 may also be provided between the bushing 48 and the first tool housing portion 14. An example of a circumferential wave spring 88 is shown in FIG. 7.

Figure 8:
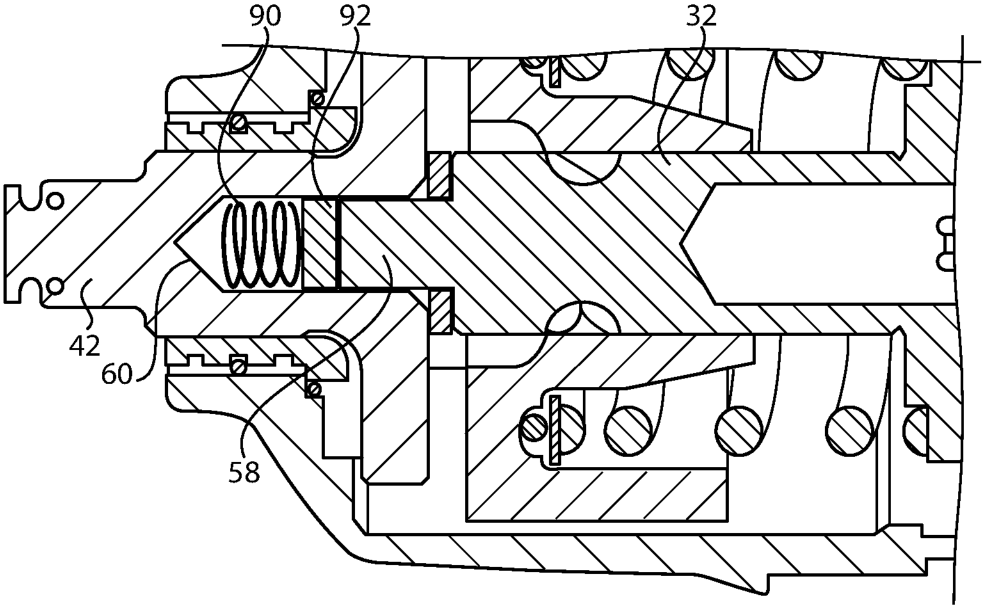
FIG. 8 is a cross-sectional view of a portion of another embodiment of an impact tool.
Figure 9:
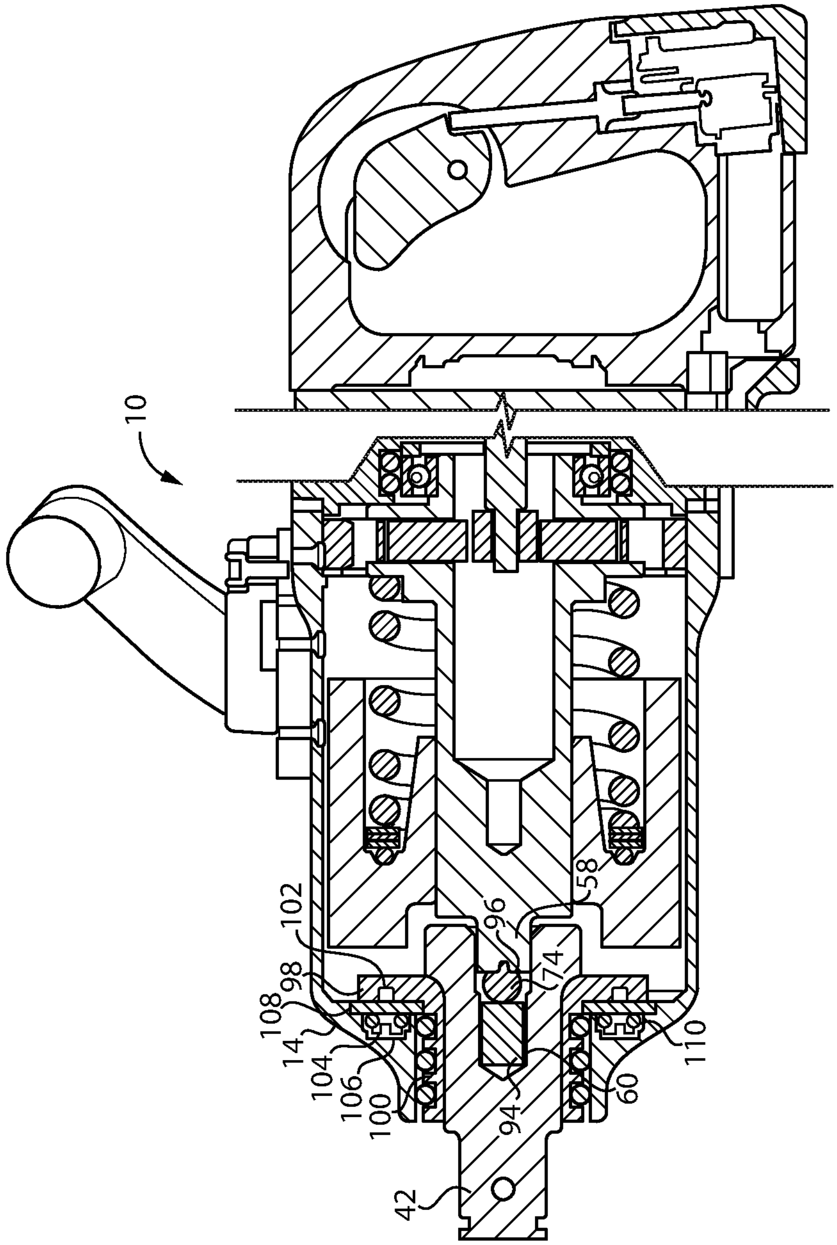
FIG. 9 is a cross-sectional view of another embodiment of an impact tool.

As shown in FIG. 8, the isolator 90 between the camshaft 32 and the anvil 42 may be a coil spring 90 in the central bore 60 of the anvil 42. A flat washer 92 may be provided between the spring 90 and the front end 58 of the camshaft 32. As shown in FIG. 9, a spacer 94 may be provided in the anvil bore 60 to provide precise positioning of the spherical isolator 74, The front end 58 of the camshaft 32 may also be provided with a rounded recess 96 to receive the spherical isolator 74.

As also shown in FIG. 9, the bushing 48 may have a radial flange 78 extending outward from the tubular portion 100. The flange 98 may be positioned between the first tool housing portion 14 and the drive members 46 of the anvil 42 (the anvil 42 is rotated in FIG. 9 to illustrate the circumferential spaces between the wings 46). Due to the rotational movement of the drive members 46 of the anvil 42, it may be preferable for the flange 98 to be rotationally restrained against the first tool housing portion 14. For example, screws 102 may be threaded into the flange 98, and the heads 104 of the screws 102 may be positioned in pockets 106 in the housing 14, An isolator 108, such as a flat washer 108 with holes for the screws 102, may also be axially positioned between the bushing flange 98 and the housing 14. It may also be desirable to provide circumferential isolators 110, such as a O-ring 110 around the head 104 of each screw 102.

Figure 10:
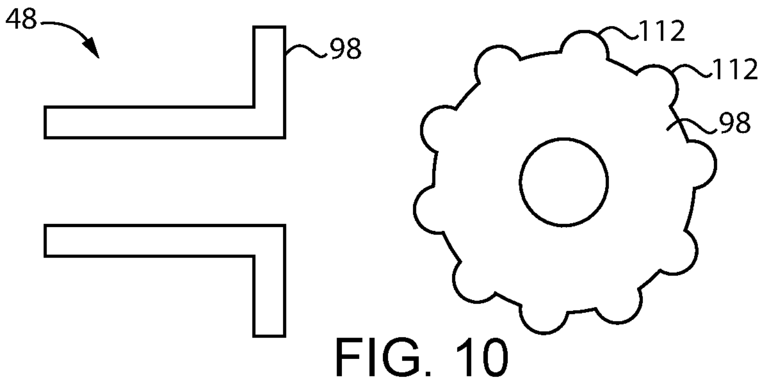
FIG. 10 is a cross-sectional and end view of a bushing.
Figure 11:
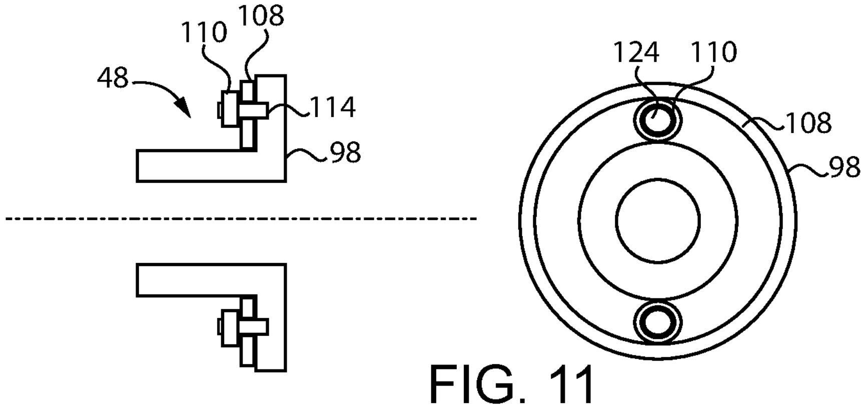
FIG. 11 is a cross-sectional and end view of another bushing.
Figure 12:
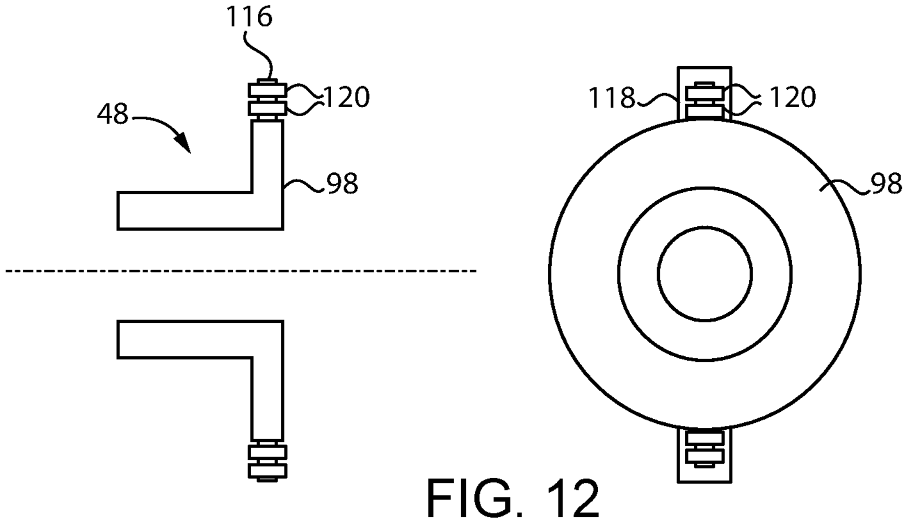
FIG. 12 is a cross-sectional and end view of another bushing.
Figure 13:
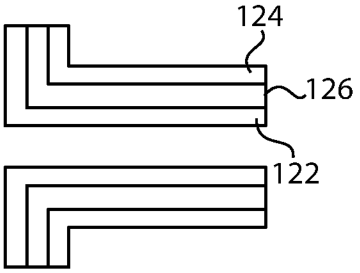
FIG. 13 is a cross-sectional view of another bushing.

As shown in FIG. 10, the bushing flange 98 may also be provided with radially extending protrusions 110 that engage mating recesses in the housing 14 to prevent rotation. As shown in FIG. 11, pins 112 may be used in place of the screws 102 in FIG. 9. As shown in FIG. 12, the bushing flange 98 may also be provided with one or more radially extending projections 116 that are positioned within mating recesses 118 in the housing 14. The projections 116 may also have isolators 120 thereabout, such as O-rings. As shown in FIG. 13, the bushing 48 may also be made of an inner metal tubular member 122 and an outer metal tubular member 124. An isolator 126 may be positioned between the inner and outer members 122, 124 and may be adhered to the inner and outer members 122 124 to hold the members 122, 124 and isolator 126 together. For example, the isolator 126 may be an injection molded material 126 injected between the members 122, 124.

Figure 14:
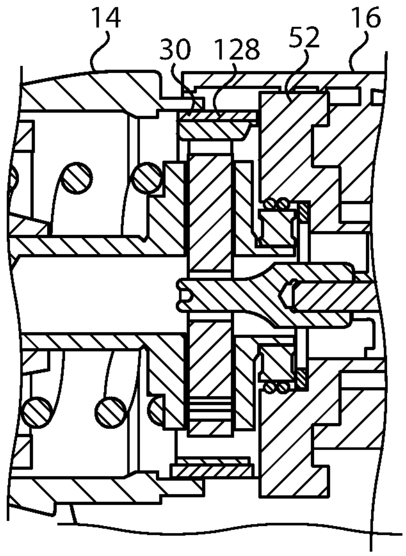
FIG. 14 is a cross-sectional view of a portion of another embodiment of an impact tool.
Figure 15:
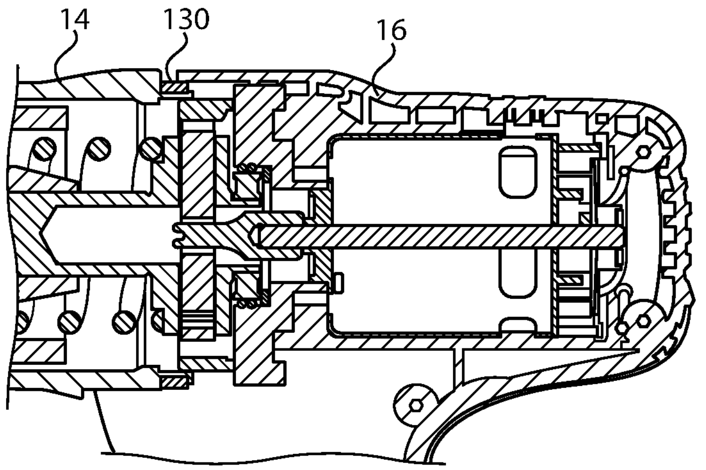
FIG. 15 is a cross-sectional view of a portion of another embodiment of an impact tool.
Figure 16:
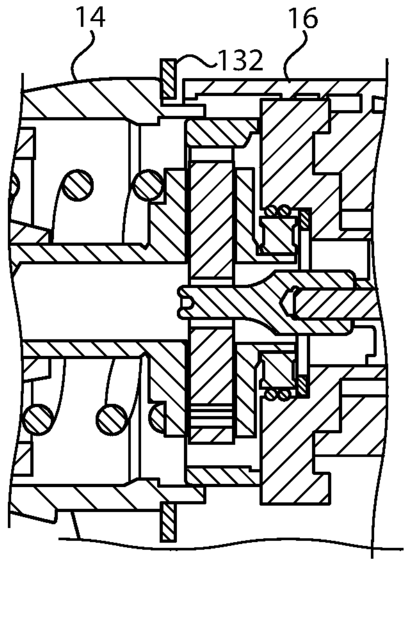
FIG. 16 is a cross-sectional view of a portion of another embodiment of an impact tool.
Figure 17:
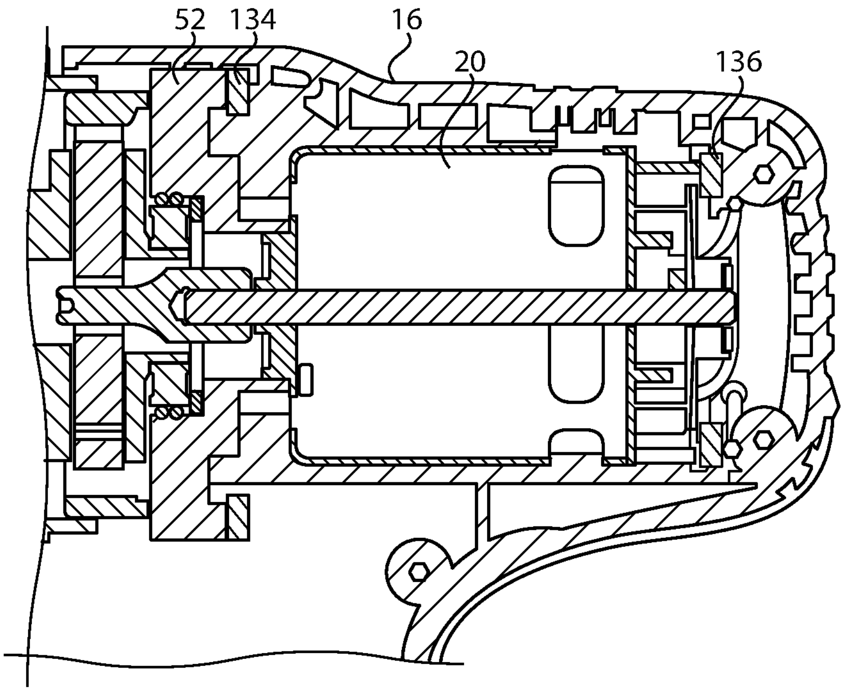
FIG. 17 is a cross-sectional view of a portion of another embodiment of an impact tool.
Figure 18:
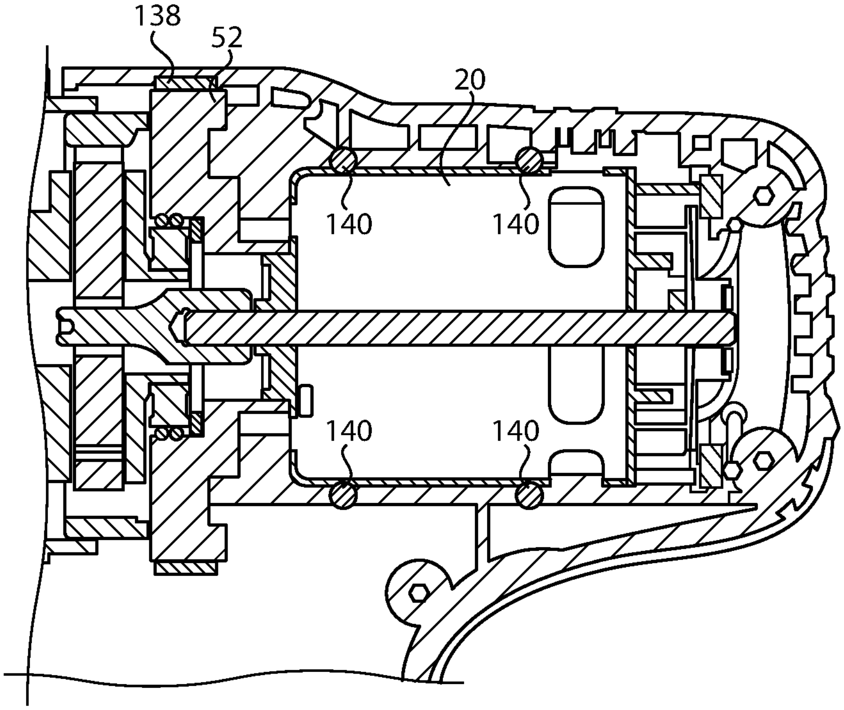
FIG. 18 is a cross-sectional view of a portion of another embodiment of an impact tool.

As shown in FIG. 14, an isolator 128 may also be provided circumferentially between the ring gear 30 and the first tool housing portion 14. As shown in FIG. 15, an isolator 130 may be positioned circumferentially between the first and second tool housing portions 14, 16. As shown in FIG. 16, an isolator 132 may also be positioned axially between the first and second tool housing portions 14, 16. As shown in FIG. 17, an isolator 134 may also be provided axially between the support member 52 and the second tool housing portion 16. As also shown in FIG. 17, an isolator 136 may be provided axially between the motor 20 and the second tool housing portion 16. As shown in FIG. 18, isolators 138, 140 may also be positioned circumferentially between the support member 52 and the housing 16 and between the motor 20 and the housing 16.

A variety of materials may be used for the isolators to dampen or otherwise deaden vibrations or sounds. In the case of spring isolators 80, 84, 88, 90, it is preferable for the isolator to be made of metal. However, in the case of non-spring isolators 62, 64, 66, 72, 74, 76, 78, 108, 110, 120, 126, 128, 130, 132, 134, 136, 138, 140, it is preferable for the isolators to be non-metal. For example, a viscoelastic material may be preferred. Also, a Shore A durometer hardness of 30-100 may be preferred for the non-metal isolators. Further, it may be preferable for the non-metal isolators to be overmolded onto one of the adjacent metal or plastic components.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An impact tool, comprising:

a motor;

a hammer comprising a first drive member rotatably driven by the motor;

an anvil comprising a second drive member, the first drive member of the hammer periodically engaging and disengaging the second drive member of the anvil such that the first and second drive members impact against each other;

a tool housing enclosing the hammer and a portion of the anvil and comprising a handle grippable by a user;

a bushing disposed between the anvil and the tool housing; and a first vibration isolator disposed circumferentially between the anvil and the tool housing to reduce transmission of vibrations from the hammer to the tool housing, wherein the first vibration isolator is viscoelastic.

2. The impact tool according to claim 1, further comprising a second vibration isolator disposed axially between the second drive member of the anvil and the tool housing.

3. The impact tool according to claim 2, wherein the bushing comprises a flange extending radially outward from a tubular portion of the bushing, wherein the flange is disposed between the second drive member of the anvil and the tool housing, and the second vibration isolator is disposed axially between the flange and the tool housing.

4. The impact tool according to claim 3, wherein the flange is rotationally restrained to the tool housing.

5. The impact tool according to claim 1, wherein the first vibration isolator has a Shore A durometer hardness of 30-100.

6. The impact tool according to claim 1, wherein the first vibration isolator is non-metal.

7. The impact tool according to claim 1, further comprising a roller bearing disposed between a shaft rotatably driving the hammer and the tool housing, wherein a second vibration isolator is disposed axially between the roller bearing and the tool housing.

8. An impact tool, comprising:

a motor;

a hammer comprising a first drive member rotatably driven by the motor;

an anvil comprising a second drive member, the first drive member of the hammer periodically engaging and disengaging the second drive member of the anvil such that the first and second drive members impact against each other;

a tool housing enclosing the hammer and a portion of the anvil and comprising a handle grippable by a user;

a bushing disposed between the anvil and the tool housing; and a first vibration isolator disposed circumferentially between the anvil and the tool housing to reduce transmission of vibrations from the hammer to the tool housing, wherein the bushing comprises an inner metal tubular member, an outer metal tubular member, and the first vibration isolator is disposed between and adhered to the inner and outer metal tubular members.

9. An impact tool, comprising:

a motor;

a hammer comprising a first drive member rotatably driven by the motor;

an anvil comprising a second drive member, the first drive member of the hammer periodically engaging and disengaging the second drive member of the anvil such that the first and second drive members impact against each other;

a tool housing enclosing the hammer and a portion of the anvil and comprising a handle grippable by a user;

a bushing disposed between the anvil and the tool housing;

a first vibration isolator disposed circumferentially between the anvil and the tool housing to reduce transmission of vibrations from the hammer to the tool housing; and a camshaft rotating in response to the motor, the hammer being disposed about the camshaft and the camshaft rotatably driving the hammer, wherein the hammer moves axially back-and-forth relative to the camshaft while rotating relative to the anvil to engage and disengage the first drive member from the second drive member.

10. The impact tool according to claim 9, further comprising a second vibration isolator disposed between the camshaft and the anvil.

11. The impact tool according to claim 10, wherein the second vibration isolator is disposed between a flange of the camshaft and a flange of the anvil.

12. An impact tool, comprising:

a motor;

a hammer comprising a first drive member rotatably driven by the motor;

an anvil comprising a second drive member, the first drive member of the hammer periodically engaging and disengaging the second drive member of the anvil such that the first and second drive members impact against each other;

a tool housing enclosing the hammer and a portion of the anvil and comprising a handle grippable by a user;

a bushing disposed between the anvil and the tool housing; and a first vibration isolator disposed circumferentially between the anvil and the tool housing to reduce transmission of vibrations from the hammer to the tool housing, wherein the motor is an electric motor rotationally driving a camshaft, wherein a second vibration isolator is disposed between the electric motor and the tool housing.

13. An impact tool, comprising:

a motor;

a hammer comprising a first drive member rotatably driven by the motor;

an anvil comprising a second drive member, the first drive member of the hammer periodically engaging and disengaging the second drive member of the anvil such that the first and second drive members impact against each other;

a tool housing enclosing the hammer and a portion of the anvil and comprising a handle grippable by a user;

a bushing disposed between the anvil and the tool housing;

a first vibration isolator disposed circumferentially between the anvil and the tool housing to reduce transmission of vibrations from the hammer to the tool housing; and a second vibration isolator disposed circumferentially between the roller bearing and the tool housing.

* * * * *